June 7, 1955

F. W. HOCH 2,710,143

SLIDE-RULE

Filed July 31, 1951

INVENTOR.
Fred W. Hoch
BY
his ATTORNEY

June 7, 1955  F. W. HOCH  2,710,143
SLIDE-RULE

Filed July 31, 1951  4 Sheets-Sheet 2

INVENTOR.
Fred W. Hoch
BY
C. P. Goepel
his ATTORNEY

June 7, 1955 F. W. HOCH 2,710,143
SLIDE-RULE
Filed July 31, 1951 4 Sheets-Sheet 3

INVENTOR.
Fred W. Hoch
BY C. P. Goepel
his ATTORNEY

June 7, 1955

F. W. HOCH 2,710,143

SLIDE-RULE

Filed July 31, 1951

INVENTOR.
*Fred W. Hoch*
BY
*C. P. Goepel*
his ATTORNEY

United States Patent Office 2,710,143
Patented June 7, 1955

2,710,143
SLIDE-RULE
Fred W. Hoch, Forest Hills, N. Y.

Application July 31, 1951, Serial No. 239,571

2 Claims. (Cl. 235—84)

This invention relates to slide rules, and more particularly to a slide rule of circular design combined with means to determine the location of the decimal point in an answer.

Elongated or circular slide rules of all kinds and for various specific purposes are well known in the art. However, it has been a serious problem to locate the decimal point in an answer, especially when relatively complicated, lengthy or multiple mathematical operations are performed.

My improved slide rule overcomes such difficulties by the provision of means thereon consisting of a plurality of transparencies or windows in one of the discs of my circular slide rule which permit observation of bands of various colors on another of the discs forming the slide rule, the combinations of colors so observed indicating the correct position of the decimal point. For example, on the original multiplcation when the color combination viewed through a pair of windows is red and white, red and black or white and black, the answer must be multiplied by ten; when the color combination is white and white, the answer will be read as shown; and when the combination is red and red, the answer is multiplied by 100. For the convenience of a second multiplication the window arrangements provide 100 times multiplication when outside window at setting point of problem is red or when both outside and inside windows are black; when the color combinations in both windows are white, the answer will be read as shown; when the color combinations are black on the outside and red or white on the inside, or white on the outside and black or red on the inside, the answer is multiplied by ten.

Of course, the selection of colors is optional and one color in various shades may be used, it being only important to have shades or colors selected so as to provide good contrasting combinations for various locations of the decimal point.

The improved slide rule will be described and its operation explained in more detail in connection with the detailed description of the accompanying drawing, wherein one embodiment of a specific circular slide rule is shown, such as used in the printing business, and the invention will be finally pointed out in the appended claims.

In the drawing, wherein like characters of reference indicate similar elements,

Fig. 2 is a side elevation of the slide rule shown in Fig. 1 or 1a;

Fig. 4 is a plan view of the rotatable disc.

Figure 3:
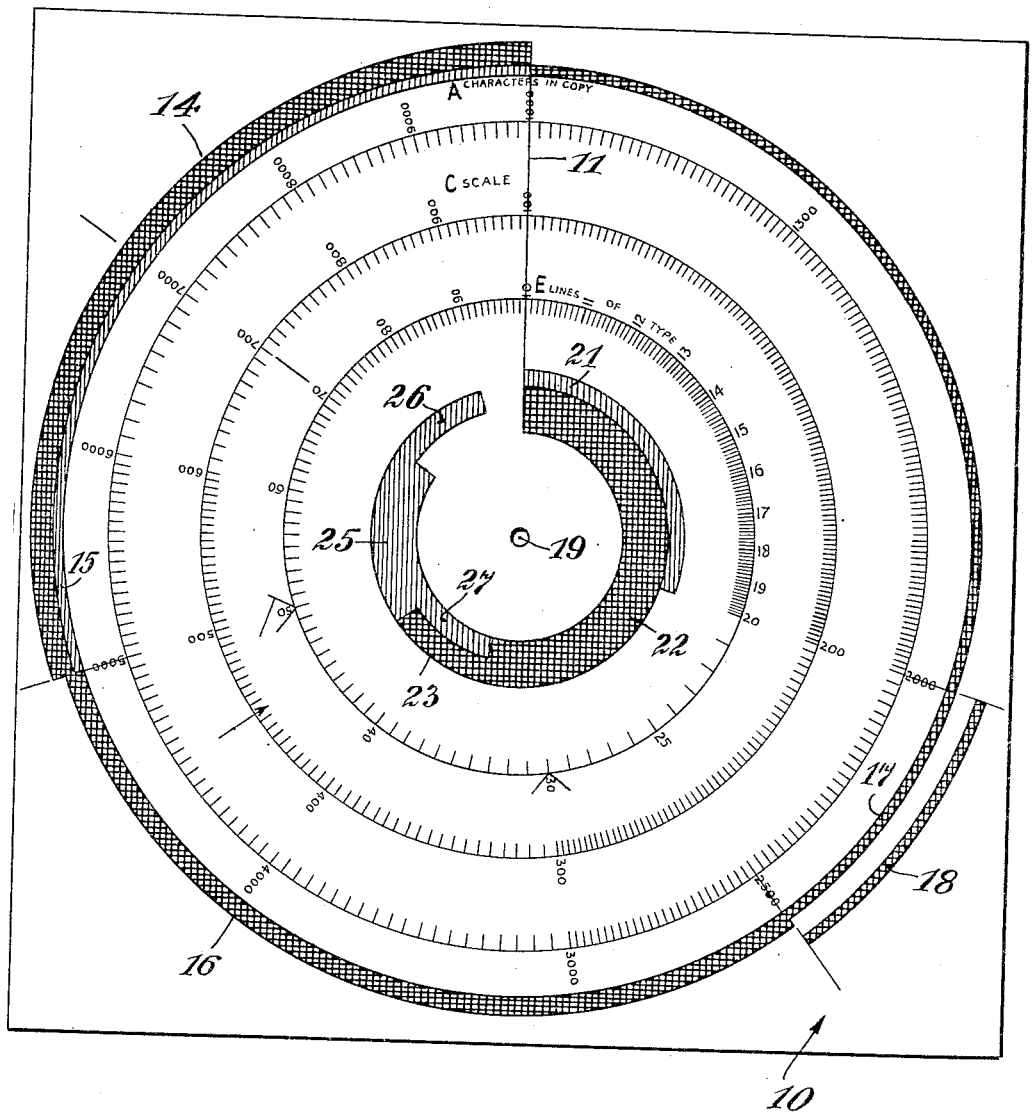
Fig. 3 is a plan view of the base plate.

Referring first to Fig. 3, the base plate 10, usually made of a suitable light and rigid plastic material, is preferably of square contour and has imprinted thereon a number of annular scales and annular bands in various colors. The location of multicolored bands depends on the number and character of the scales, three such scales being shown in Fig. 3.

The outermost scale A indicates the number of characters per copy in a printing job and is successively numbered from 1000 to 9900 in clockwise direction, the graduation increasing by ten from 1000 to 1300, by 20 from 1300 to 2500, by 40 from 2500 to 3000, by 50 from 3000 to 6000, and by 100 from 6000 to 9900, in a logarithmic progression. All the graduations are not numbered for clarity's sake.

The middle annular scale in Fig. 3 is marked C and carries numbers between 100 and 990, also in clockwise direction, the numeral 100 being on a radial line 11 with numeral 1000 on scale A.

The innermost annular scale is marked E and ranges from 10 to 90 in clockwise direction, the numeral 10 again being on the radial line 11.

A band 15 in red color extends concentrically around a portion of scale A between numerals 1000 and 5000, is of uniform thickness and is surrounded by a black band 14. Said band 14 continues into bands 16 and 17, and a short band portion 18, also in black color is shown between numerals 2000 and 2500 on scale A.

Surrounding center 19 of the base plate 10, there are spaced inside scale E a number of bands 21, 22, 25, band 22 being in black and bands 21 and 25 in red colors.

The remaining portion of base plate 10 is white, and the combination of these three colors, to wit: white, black and red, is material in determination of location of the decimal point. As stated before, the presented color combinations of black, white and red are optional, it being important that the bands and band portions 14, 16, 17, 18, 22, 23 on the one hand, bands 15, 21, 25, 26, 27 on the other hand, and the remainder of the surface of base plate 10 be easily distinguishable from each other.

Figure 1:
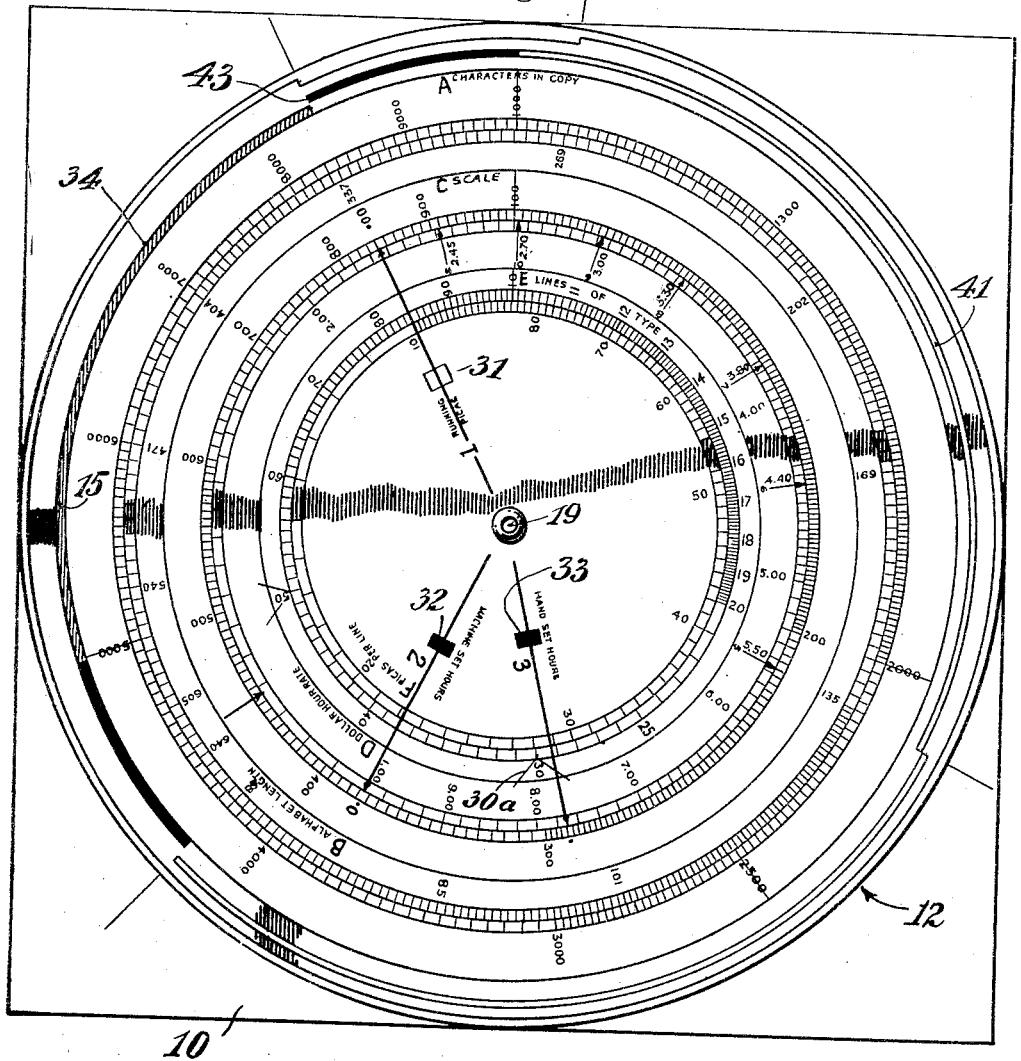
Figs. 1 and 1a are plan views of the improved slide rule.
Figure 2:
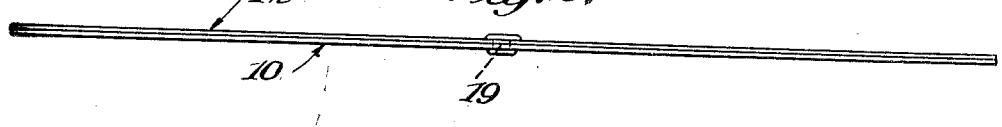
Figure 1A:
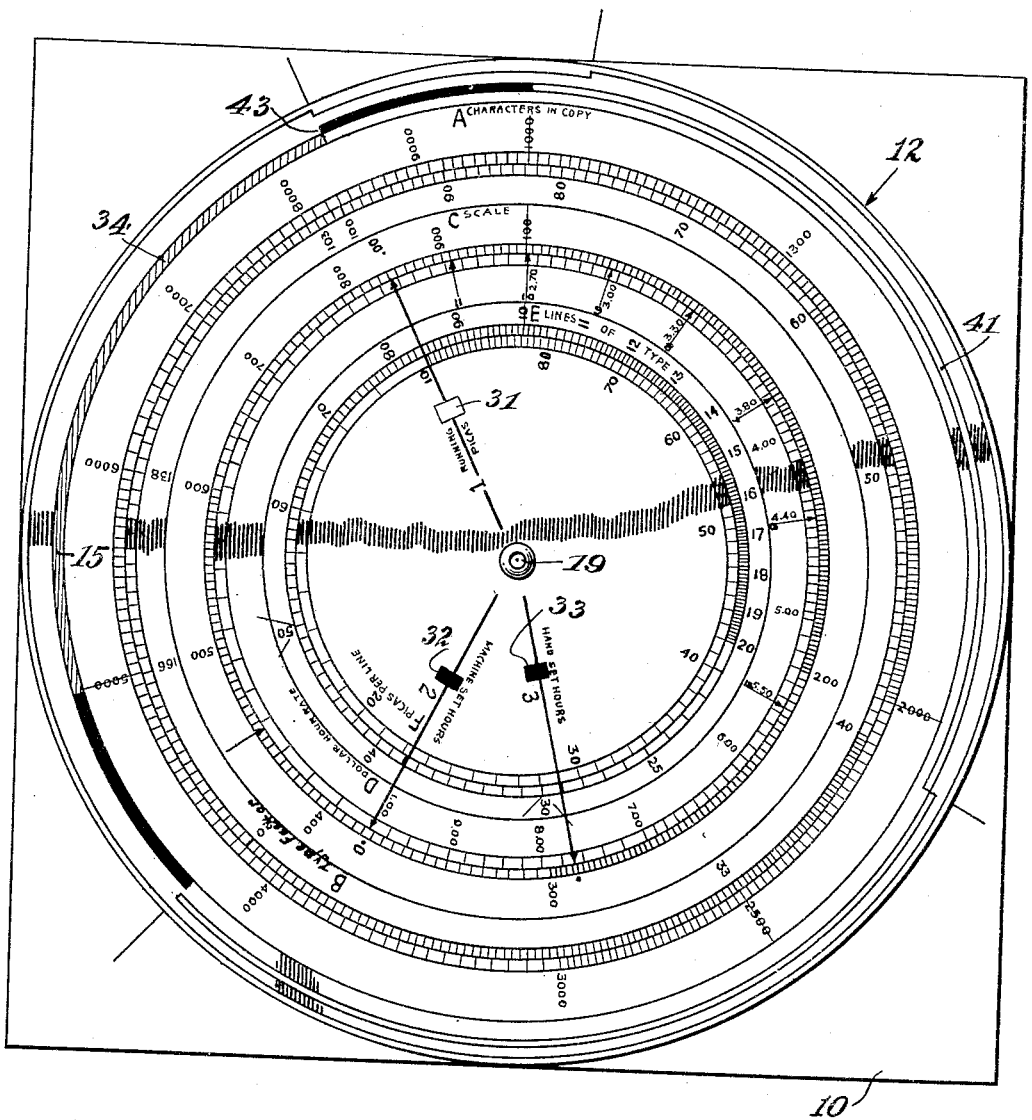

The circular disc 12 illustrated in Fig. 4 is of a color or shade differing from the basic color (white) of base plate 10 and from the bands on said base plate. It has a plurality of annular transparencies to permit observation and reading of scales on base plate 10 when the disc 12 and base plate 10 are joined as shown in Figs. 1 and 1a, or in Fig. 2. Disc 12 also carries a plurality of openings or transparencies to permit observation of portions of the colored bands and of the basic color of the base plate 10. Also, a number of windows 31, 32, 33 are provided inside the innermost scale F, these windows being in the path of arrows numbered 1, 2, 3, pointing to selected portions of scale C. For clarity's sake, the transparencies on disc 12 for observation of the scales A, C, E on plate 10 will hereinafter be referred to as transparencies, the openings or transparencies for observation of color bands and portions of base plate 10 surrounding the outermost scale B on disc 12 will be referred to as openings, and the transparencies or apertures 31, 32, 33 inside the innermost scale F on disc 12 will be hereinafter referred to as windows. Obviously, any of these transparencies, openings or windows may be simply transparent portions on disc 12, or they may be actual windows or cutouts in the disc 12.

The scales A, C, E on base plate 10, and scales B, D, F on disc 12 are for a slide rule used in the printing business to give ready answers when determination of running picas per copy, of cost for setting a copy in machine hours or manhours is calculated, the number of lines required for setting a copy with characters of a special size, etc. It will be noted that slide rules illustrated in Figs. 1 and 1a differ only in that they carry different scales. Some specific examples are given hereinbelow for explanation of the method to determine the location of the decimal point in an answer.

For proper readings on the slide rule illustrated in Fig. 1a, the following combinations of colors must be remembered.

1. Readings at the tip of arrow 1 (combination of colors observable through opening surrounding scale A and through window 31):

(a) White and white—read as shown.
(b) Red and red—multiply by 100.
(c) All other combinations—multiply by 10.

2. Readings at the tip of arrow 2 (combination of colors observable through opening surrounding scale A and through window 32):

(a) White and white—read as shown, with zero preceding the first numeral in the answer.
(b) Black and black or scale A red—multiply by 100.
(c) All other color combinations—multiply by 10.

3. Readings at the tip of arrow 3 (combination of colors observable through opening surrounding scale A and through window 33):

(a) White and white—read as shown with decimal point preceding the first numeral in the answer.
(b) Both black or scale A red—multiply by 100.
(c) All other combinations—multiply by 10.

*Example I*

Referring to the slide rule illustrated in Fig. 1a, numeral 40 on scale B is approximately in registry with numeral 2100 on scale A, and the answer may be read at the point of arrow 1 on scale C. Thus, if it is desired to determine 40% of 2100, the answer will be 840 on scale C, and the decimal point is clearly indicated by the combination of colors seen through the opening 41 surrounding numeral 2100 on scale A, and through window 31 in the path of arrow 1 inside the innermost scale F. Both show white portions of the base plate 10 and therefore the answer must read as is, i. e. 840.

*Example II*

By using the same setting on slide rule shown in Fig. 1a, it will be seen that 90% (scale B) of 9300 (scale A) is approximately 8400. The opening 43 surrounding numeral 9300 on scale A shows a black portion of base plate 10, and the window 31 shows white color. The combination of the black and white colors requires a multiplication by ten to obtain the proper location of the decimal point, and therefore the answer 840 shown by the point of arrow 1 on scale C must be multiplied by 10 to obtain the result of 8400.

*Example III*

Again using the same setting on scales shown in Fig. 1a, it may be read that 140% (scale B) of 6000 (scale A) is 8400 (tip of arrow 1 on scale C). Window 31 shows white color on base plate 10 and the opening 34 surrounding numeral 6000 on scale A shows red band portion of base plate 10; therefore the result shown as 840 at the tip of arrow 1 on scale C must be multiplied by 10 to obtain the location of the decimal point.

Arrow 2 passing through window 32 indicates answers on scale C obtained by multiplication of the result shown at the tip of arrow 1 by 0.00045. Therefore, the decimal point is in front of the numeral indicating the answer at the tip of arrow 2 and is preced by a zero when the answer is to be read as it is, i. e. when the opening above the initial number on scale A and the window 32 are both white.

*Example IV*

When the result (840) obtained in Example I is multiplied by 0.00045, the final result is 0.380, as shown at the tip of arrow 2. The opening 41 surrounding numeral 2100 on scale A is white and the window 32 is black, therefore the result must be multiplied by 10 (10×0.0380=0.380).

*Example V*

When the result obtained in the Example II (8400) is multiplied by 0.00045, the answer is 3.80. The window 32 shows black and the opening 43 surrounding 9300 on scale A is also black, therefore the numeral indicated at the tip of arrow 2 (0.0380) must be multiplied by 100 to obtain the location of the decimal point.

*Example VI*

When 8400 obtained as answer in Example III, is multiplied by 0.00045, the answer is 3.80. The opening 34 surrounding 6000 on scale A is red, therefore the numeral 0.0380 indicated at the tip of arrow 2 must be multiplied by 100.

Similar examples may be given for answers at the tip of arrow 3.

It may be seen from the above examples that the location of the decimal point is a very simple procedure. Arrow 3 again gives another result and the combinations of colors will again determine the location of the decimal point. The positioning of bands on base plate 10 depends entirely on the character of scales carried by disc 12 and base plate 10.

While one specific slide rule has been illustrated and described hereinabove, it is obvious that various changes and modifications may occur to the persons skilled in the art, and I do not desire to be limited to the exact details shown but only by the scope of the appended claims.

I claim:

1. In a circular slide rule having a base plate and a circular disc concentrically and rotatably connected to said base plate, said base plate carrying a plurality of concentric annular scales and said disc carrying a plurality of concentric annular scales, each of said scales on said disc being in registry with a selected scale on said base plate, the combination of a plurality of multicolored bands on said base plate, a first group of said bands surrounding the outermost of said scales on said base plate and a second group of said bands being inside the innermost of said scales on said base plate, and said disc having a plurality of first transparencies annularly arranged to show selected portions of said first group of said bands on said base plate, a plurality of second transparencies to permit observation of said scales on said base plate, a plurality of third transparencies to show selected portions of said second group of said bands on said base plate, and indicating means pointing to the answer on a selected one of said scales on said base plate, the combinations of colors on said base plate observable through said first and said third transparencies in said disc indicating the location of the decimal point in the answer.

2. In a circular slide rule having a base plate and a circular disc concentrically joined for rotation with respect to each other, said base plate and said disc each carrying a plurality of concentric annular scales, the combination of a plurality of bands in annular arrangement surrounding the outermost scale on said base plate and within the innermost scale on said base plate, said bands being in different colors and differing from the basic color of said base plate, said disc having a plurality of openings in annular arrangement and close to the periphery thereof, a plurality of transparent portions in annular arrangement superimposed to said scales on said base plate, and a plurality of windows inside the innermost of said scales on said disc superimposing said bands on said base plate and inside the innermost scale on said base plate, and a plurality of indicating means on said disc radially arranged and each passing through one of said windows, said indicating means pointing toward the answer to a mathematical problem found by said slide rule, and the combinations of colors observable through said openings and said windows indicating the position of the decimal point in the answers.

References Cited in the file of this patent

UNITED STATES PATENTS

| | | |
|---|---|---|
| 922,465 | Fenn | May 25, 1909 |
| 2,561,263 | Babcock | July 17, 1951 |

OTHER REFERENCES

Page 505, of the "Twentieth Century Encyclopedia of Printing," by Martin Heir, and published by the Graphic Arts Publishing Co. of Chicago, Ill., in 1930.